United States Patent [19]

Camras

[11] 3,967,318
[45] June 29, 1976

[54] VIDEO MAGNETIC TRANSDUCER SYSTEM WITH PHASE CORRECTING NETWORK

[75] Inventor: Marvin Camras, Glencoe, Ill.

[73] Assignee: IIT Research Institute, Chicago, Ill.

[22] Filed: Aug. 9, 1974

[21] Appl. No.: 496,293

Related U.S. Application Data

[60] Continuation of Ser. No. 312,514, Dec. 6, 1972, abandoned, and a continuation-in-part of Ser. No. 34,504, May 4, 1970, Pat. No. 3,705,954, which is a division of Ser. No. 649,256, June 27, 1967, Pat. No. 3,596,008.

[52] U.S. Cl. ................................................. 360/65
[51] Int. Cl.² ........................................... G11B 5/45
[58] Field of Search ................. 360/25, 26, 123, 65; 333/28

[56] References Cited
UNITED STATES PATENTS

| | | | |
|---|---|---|---|
| 2,588,915 | 3/1952 | Erikson | 360/26 |
| 2,657,276 | 10/1953 | Eliot | 360/26 |
| 2,876,296 | 3/1959 | Youngquist | 360/123 |
| 3,843,573 | 10/1974 | Kosaka | 360/25 |

*Primary Examiner*—Vincent P. Canney
*Assistant Examiner*—Alan Faber
*Attorney, Agent, or Firm*—Hill, Gross, Simpson, Van Santen, Steadman, Chiara & Simpson

[57] ABSTRACT

One embodiment of video transducing system supplies a reproduced video signal with compensated amplitude response so as to exhibit a substantial phase advance for recorded half wavelengths less than the thickness of the magnetizable layer, and a phase correcting network is inserted between the playback winding and the playback amplifier.

In a further embodiment, amplitude and phase are partially compensated such that there is a substantial amplitude fall off and a moderate phase advance at the highest frequencies of the useful range, and such that the leading edge of a step function when played back has an overshoot of approximately one to six decibels.

2 Claims, 7 Drawing Figures

U.S. Patent  June 29, 1976  3,967,318
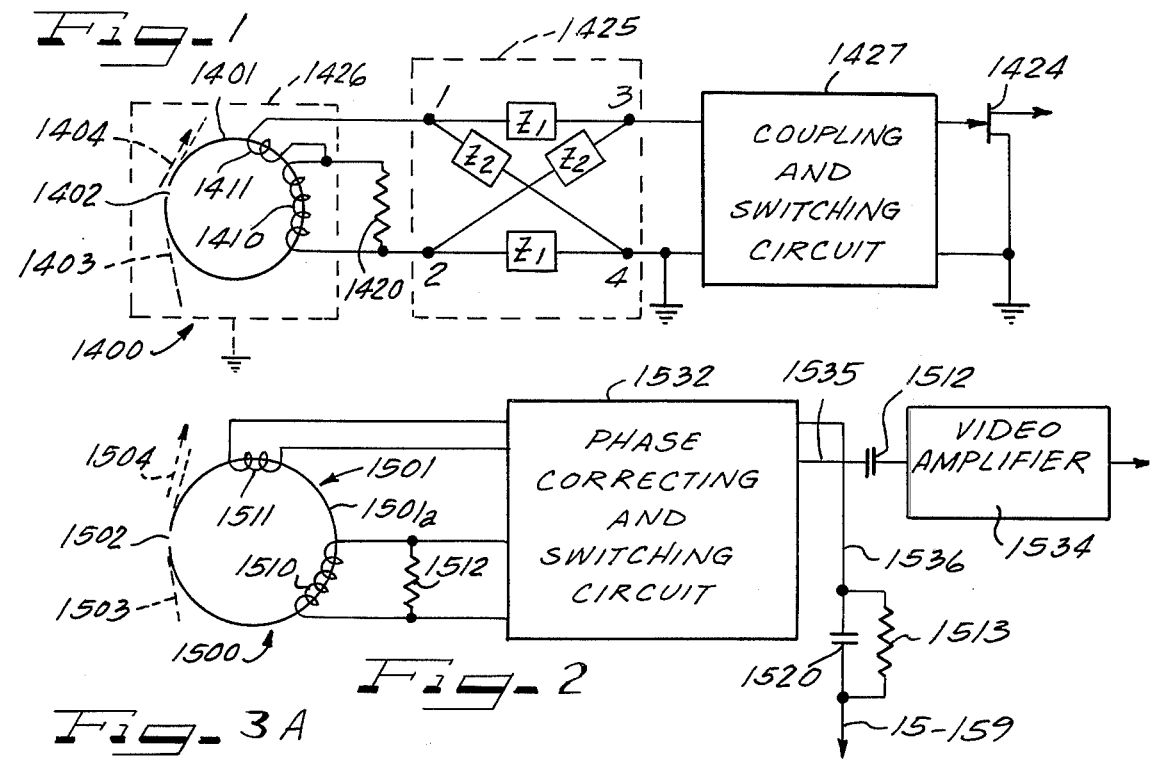
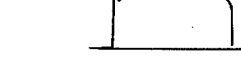
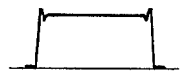
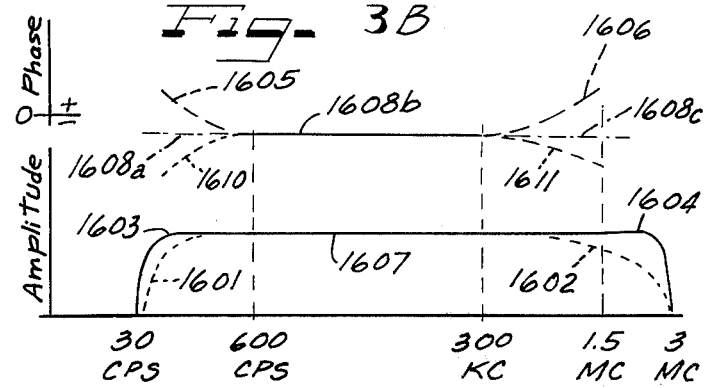
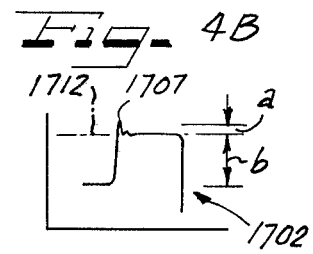
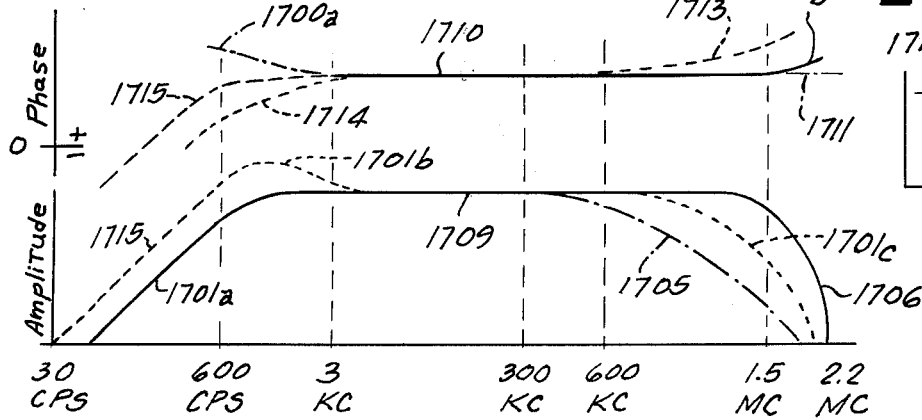

VIDEO MAGNETIC TRANSDUCER SYSTEM WITH PHASE CORRECTING NETWORK

CROSS REFERENCES TO RELATED APPLICATIONS

The present application is a continuation of my application Ser. No. 312,514 filed Dec. 6, 1972 (now abandoned), and a continuation in part of my copending application Ser. No. 34,504 filed May 4, 1970 (now U.S. Pat. No. 3,705,954 issued Dec. 12, 1972). Said application Ser. No. 34,504 in turn is a division of my application Ser. No. 649,256 filed June 27, 1967 (now U.S. Pat. No. 3,596,008 issued July 27, 1971).

SUMMARY OF THE INVENTION

This invention relates to a wide band transducing system and method, and particularly to a system for recording and/or reproducing black and white and color television signals.

It is an object of the present invention to provide an economical television transducing system such as would be particularly suitable for home or educational uses.

Another object of the invention is to provide a wide band transducer system capable of effectively transducing signals with frequency components extending into the megacycle range at head scanning speeds of 120 inches per second or less.

Yet another object of the invention is to provide a system for recording and/or reproducing television signals such as those which may be obtained from present commercial broadcast receivers, with the use of a low cost tape transport and stationary head units scanning the tape in the direction of movement; and also to provide such a system for color television signals.

It is also an object to provide simple means for phase error correction in video recording and/or playback circuitry.

Other objects, features and advantages of the present invention will be apparent from the following detailed description taken in connection with the accompanying drawing.

NONESSENTIAL MATERIAL INCORPORATED HEREIN BY REFERENCE FOR PURPOSES OF INDICATING THE BACKGROUND OF THE INVENTION

FIGS. 1-13, the brief description thereof, and col. 3, line 40 through col. 30, line 26 and col. 30, lines 69-71 of my U.S. Pat. No. 3,596,008 are incorporated herein by reference, particularly to provide a basis for reference to said FIGS. 1-13 in the following detailed description.

BRIEF DESCRIPTION OF THE DRAWINGS

FIG. 1 is an electric circuit diagram showing a phase correction circuit used directly at the head windings (this embodiment being described in my U.S. Pat. No. 3,596,008, at column 18, line 50 through column 19, line 13);

FIG. 2 is an electric circuit diagram showing a television recording and playback system using oppositely connected head windings (as described in my U.S. Pat. No. 3,596,008 at column 15, lines 59-71 and column 22, lines 25-67);

FIG. 3 comprises FIGS. 3A, 3B and 3C, FIG. 16A showing diagrammatically the step response for the case where a video amplifier utilizes resistance-capacitance amplitude compensation for the purpose of securing a substantially flat frequency response;

FIG. 3B is a diagrammatic showing of phase and amplitude response as a function of frequency, as modified at high and low frequencies by tape thickness and head dimensions and as corrected; and FIG. 3C shows the waveform obtainable in response to a square wave recorded signal where a combination of resistance-capacitance amplitude compensation and phase compensation in accordance with FIG. 3B is utilized;

FIG. 4 comprises FIG. 4A and 4B, FIG. 4A illustrating changes in amplitude and frequency response effected by the correcting circuits; and FIG. 4B shows the square waveform response obtainable for a system having amplitude and phase characteristics as represented in FIG. 4A, corrected according to one mode of operation.

DETAILED DESCRIPTION OF THE EMBODIMENTS OF FIGS. 1-4

It will be noted that the description of FIGS. 1 through 13 which are incorporated herein by reference is found in the specification of my U.S. Pat. No. 3,596,008, particular attention being directed to FIG. 6A and FIG. 12, and the description pertaining to FIG. 6A at column 14, lines 62 and 63, column 15, lines 59-71, column 22, lines 37-67, and column 23, lines 6-27, and pertaining to FIG. 12 at column 14, line 49 through column 15, line 71, and column 18, line 19 through column 19, line 47.

DESCRIPTION OF FIG. 1

FIG. 1 is based on the disclosure of my U.S. Pat. No. 3,596,008 at column 18, line 53 through column 19, line 13. The basis for the following description is indicated by references in brackets to said patent preceding the various passages. [column 18, line 22 et seq.] The head 1400 may correspond to that described in connection with incorporated FIG. 5, the head comprising a core 1401 with a coupling gap 1402 across which a magnetic tape record medium moves as indicated by the dash line 1403 and the arrow 1404. The head is provided with windings 1410 and 1411 which may have different numbers of turns as described in connection with the other embodiments of said U.S. Pat. No. 3,596,008. The windings 1410 and 1411 may be in series aiding relation at low frequencies. [Column 18, line 31 et seq.] By way of example, winding 1410 may have 450 turns and a resistance of 79 ohms, while winding 1411 may have 150 turns and a resistance of 13 ohms. As a second example, windings 1410 and 1411 may have 150 turns and 50 turns, respectively, with resistances of 11 ohms and 2.3 ohms. One or both of the windings may be damped, a damping resistor being indicated at 1420 across winding 1410. The circuit of FIG. 1 has the advantage that the resistance of the head windings may be quite low. [Column 18, lines 50-52.] The windings are connected with a network 1425 which may be replaced by other types of phase correcting circuits, as for example the parallel T, or bridged T networks.

Actually shown in FIGS. 24 is a lattice type of phase correcting network. [Column 18, lines 57 et seq.] For playback operation, the lattice network 1425 may be interposed between the windings 1410 and 1411 and the input of a field effect transistor 1424. The lattice network is shown as comprising impedances Z1 connected between terminals 1 and 3 and between terminals 2 and 4, and impedances Z2 between terminals 1 and 4 and between terminals 2 and 3. An important advantage of incorporating the phase correction network 1425 directly at the head winding terminals (either for a recording head or for a playback head, or for a recording and playback head) is that neither head winding terminal 1 or 2 has to be grounded, and thus a lattice-type network can be used. A lattice network is most general and most flexible, but cannot have both its input and output sides grounded. With the arrangement as shown, the side of the lattice network remote from the head windings can have terminal number 4 grounded as is usual when operating into an amplifier, and the head winding terminals number 1 and number 2 may be floating relative to ground potential. [Column 18, line 75 et seq.] As a specific example of a lattice-type network, the impedances Z1 can be capacitors of equal value between terminals number 1 and number 3 and between terminals number 2 and number 4, and the impedances Z2 can be resistors of equal value between terminals number 1 and 4, and between terminals number 2 and number 3. The "crossover frequency" is the frequency where the capacitive reactance equals the resistance. The head case indicated at 1426 is preferably grounded, but insulated from the windings 1410 and 1411. For lattice-type network the center tap between windings 1410 and 1411 should not be grounded.

[Column 19, lines 11–13.] Where the network of FIG. 1 is used for recording and playback, record-play switching can be provided as indicated at 1427 at the side of the network 1425 remote from the head windings.

GENERAL DISCUSSION

[Column 19, line 15 et seq.] Head windings may be connected in series aiding relation at low frequencies, and this will be the correct polarity when the windings are used in the systems of incorporated FIGS. 1, 2 and 3 of my U.S. Pat. No. 3,596,008. Alternatively a single winding head may be used corresponding to the winding 11 of FIG. 1 of the incorporated drawings, with a shorting link replacing the winding 10 and resistor 120. In this case, a damping resistor may be added in parallel with the single winding corresponding to winding 11 in FIG. 1.

[Column 19, line 30 et seq.] If the head windings are used in series opposed polarity at low frequencies then the switching of FIG. 5 of the incorporated drawings should be substituted in the systems of FIGS. 1, 2 or 3. This head connection gives high frequency phase correction.

[Column 19, lines 42–44] In general, a single winding head may be used in the systems disclosed herein as utilizing series aiding winding connections. [Column 19, lines 45–47] The components shown herein as fixed in value may be made adjustable.

PREFERRED HEAD CONSTRUCTION

[Column 19, line 72 et seq.] The head of my U.S. Pat. No. 3,534,177 issued Oct. 13, 1970 is particularly advantageous for recording of television signals, and it has been found that coin silver (90% silver, 10% copper) or sterling silver (92% silver, 8% copper) core mounts are advantageous electrically because of high conductivity, and mechanically because of good wearing properties and freedom from contamination of the tape surfaces. This type of head is specifically disclosed herein as being used in each of the record and/or playback systems disclosed or referred to or incorporated herein.

[Column 20, lines 15–17] Another less expensive alloy for the core mounting blocks of said U.S. Pat. No. 3,534,177 is an alloy containing approximately 1% silver and 99 % copper.

DESCRIPTION OF FIG. 2

FIG. 2 is based particularly on a description of my incorporated U.S. Pat. No. 3,596,008 at column 15, lines 59–71 and column 22, lines 25–67. [Column 14, line 50 et seq.] In correcting the frequency response of the tape and head in the short wavelength high frequency region a phase advance occurs in the region where effective tape thickness equals or exceeds half the recorded wavelength. For example at a tape velocity of 30 inches per second and an effective magnetic layer thickness of 0.2 mil (1 mil equals 0.001 inch), the effect occurs for wavelengths 0.4 mil or shorter, and for frequencies equal or greater than: $f = v/\lambda = 30/0.0004 = 75,000$ cycles per second, where $f$ is the frequency, $v$ is the tape velocity and $\lambda$ is the recorded wavelength.

[Column 14, lines 61–63] This phase advance may be corrected by the circuits of incorporated FIGS. 3, 4, 11, or 12. Correction is also achieved by head windings oppositely connected as contemplated in the embodiment of FIG. 2.

In particular head 1500 is shown as comprising a magnetic core 1501 with a coupling gap 1502 across which a magnetic tape record medium moves as indicated by dash line 1503 and arrow 1504. The head is provided with windings 1510 and 1511 which may have different numbers of turns as described in connection with the other embodiments. During playback operation, windings 1510 and 1511 are to be connected in series opposing relation at low frequencies. [Column 19, lines 33–34] This head connection gives high frequency phase correction.

The circuitry for connecting windings 1510 and 1511 in series opposing relation during playback operation is indicated as phase correcting and switching circuit component 1532 in FIG. 2.

[Column 19, lines 30–34] If the head windings are used in series opposed polarity at low frequencies as in FIG. 2 then the switching of FIG. 5 should be substituted in the system of FIG. 1, for example. This head connection gives high frequency phase correction.

[Column 10, line 26 et seq.] Referring to FIG. 2, the magnetic head may have the structure described in my U.S. Pat. No. 3,534,177, and may include a first winding 1510 having a relatively large number of turns encircling the core 1501 at a base region 1501a and may have a second winding 1511 with fewer turns and in closer proximity to the coupling gap 1502; for example, the winding 1511 may be in closer proximity to the coupling gap by having at least a portion of most of the turns thereof closer to the coupling gap than any of the turns of windings 1510. Thus, the closer proximity may be achieved by winding 1511 being wound on top of the winding 1510 where winding 1510 encircles the base portion 1501a of the core 1501.

[Column 10, lines 43–45] The windings 1510 and 1511 may be connected in series opposition with the phase correcting and switching component 1532 corresponding to that shown in incorporated FIG. 5 and with amplifier 1534 corresponding to that of incorporated FIG. 1. [Column 10, line 45 et seq.] In recording mode of switching circuit of component 1532 in this case, a recording signal supplied to conductor 15-159 corresponding to conductor 159 in incorporated FIG. 1 is supplied to one side of winding 1511 while the other side is grounded. During playback mode, the input to video preamplifier 1534 is connected with windings 1510 and 1511 with the same polarities as in FIG. 1. Thus, the arrangement of incorporated FIG. 5 when utilized with a four stage amplifier 1534 provides for the inverting of the video signal during recording relative to the playback polarities, in comparison with the arrangement of incorporated FIG. 1. It is optional to ground the input like 1535 leading to amplifier 1534 during recording and to ground the recording signal line 1536 during playback.

[Column 14, line 50 et seq.] As previously explained in correcting the frequency response of the tape and head in the short wavelength high frequency region a phase advance occurs in the region where effective tape thickness equals or exceeds half the recorded wavelength. [Column 14, lines 61–62] This phase advance may be corrected by the circuit 1425 of FIG. 1. [Column 14, lines 62–65] Correction is also achieved by head windings oppositely connected in conjunction with amplifier 1534 corresponding to that shown in FIG. 1 or FIG. 2, or the additional correction of incorporated FIGS. 3, 4, 11 or 12 may be applied.

[Column 15, line 51 et seq.] An alternative to the phase correction methods described above is to operate the television record/reproduce system with a falling response of output as the function of frequency in the high frequency region where the effective thickness T of the magnetizable layer of the record tape is greater than $\lambda/2$. A drop of 2 to 6 decibels per octave was found to give excellent pictures, this being obtained with the system of incorporated FIG. 1 and for tape speeds of 30 to 60 inches per second. Even at a steeper fall off, good results were obtained. A combination of the phase correction method and the falling response method is recommended as the best compromise, where phase correction by circuitry as at 1532 in FIG. 2 is made in the wavelength region where tape thickness becomes greater than one-half the recorded wavelength of the high frequency picture components ($\lambda/2 < T$, or $\lambda < \lambda_t$ where the symbol $\lambda_t$ is used to represent the recorded wavelength such that $\lambda_t/2$ is equal to the tape thickness T); and where the falling response is used in the highest frequency range corresponding to recorded wavelengths 0.2 to 0.1 as long as the $T = \lambda/2$ criterion, ($\lambda = .2\lambda t$ to $.1\lambda t$). Thus, if $T = .2$ mil, $\lambda t/2 = 0.2$ mil, $\lambda t = 0.4$ mil, $0.2\lambda t = .08$ mil and $0.1\lambda t = .04$ mil. Such results are obtained with the circuits of incorporated FIGS, 3, 4, 6A, 6B and 11, and in FIG. 2 herein, when operated at 30 to 120 inches per second with commercial tapes.

[Column 22, line 12 et seq.] A series opposing relation has been disclosed and described in detail in my U.S. Pat. No. 3,531,600. In this case, the overall circuitry is arranged to provide an improved response characteristic taking advantage of the fact that the high impedance winding such as 1510 is resonant at a relatively lower frequency such as at about 50 kilocycles to about 250 kilocycles per second while the low turns winding such as 1511 is resonant at a much higher frequency such as at about 2 megacycles per second. The two video windings of each video head unit in series complement each other thereby extending the total frequency response. By way of example windings 1511 and 1510 may have 200 turns and 1200 turns respectively.

[Column 22, line 25 et seq.] With the series opposing relationship between windings 1510 and 1511, during playback at low frequencies the output of winding 1511 substracts from the output of winding 1510 reducing the output of winding 1510 by perhaps 20%, which is not significant. At frequencies about the resonance of the high turns winding 1510, the output of this winding reverses in phase and aids the output of winding 1511. At still higher frequencies above the resonance of winding 1511, the output of winding 1511 reverses phase and again is of opposite phase relative to the output of winding 1510; however at these frequencies the output of winding 1510 is insignificant.

[Column 22, line 37 et seq.] The phase shift in the playback amplifier such as 1534 associated with the windings 1510 and 1511 is the reverse of that of the combined windings (as a function of frequency) so that an overall smooth phase characteristic (constant time delay) as a function of frequency results at the output of the amplifier 1534, except at the very lowest and highest portions of the spectrum. (See portions 1700a and 1700b of curve 1700, FIG. 4A.) Thus, the overall effect of the recording and playback system of FIG. 2 is produced at the output of the playback amplifier 1534 video signal components having essentially the same phase relationship as the original component signals supplied by the television receiver during recording as represented by curve 1700a, 1700b, FIG. 4A. Further, the frequency components of the video signal such as the signal supplied by playback amplifier 1534 have the same phase relationships as the corresponding frequency components of the original signal.

[Column 22, line 52 at seq.] The response of the playback amplifiers such as 1534 as a function of frequency is purposely made to drop rapidly of frequencies below about 300 to 600 cycles per second (as indicated at 1701a of curve 1701, FIG. 4A) in order to reduce hum and low frequency transistor noise, giving important economies since it it not necessary to use elaborate shielding or expensive low-noise transistors in the playback amplifier circuitry. It has been found that boost in amplitude response as a function of frequency of perhaps 3 decibels to 10 decibels at frequencies above the low frequency cut off, for example a boost in the frequency range from 600 cycles per second to 3000 cycles per second, (as indicated at 1701b in FIG. 4A) is beneficial in giving a smooth time delay characteristic at low frequencies, that is in giving a relatively constant time delay over the entire useful video range when this feature is used with the transducers and circuitry as described.

[Column 23, line 6 et seq.] At the highest frequencies of the effective bandwidth of the record-playback system of FIG. 2, the playback amplifier 1534 provides adequate amplitude compensation in conjunction with the recording equalizer circuits, (for example as indicated at 1701c in FIG. 4A) but phase conpensation of these highest frequencies (as indicated at 1700b, FIG. 17A) may not be exact. Such lack of exact phase compensation at the highest frequencies has been found to very practical in an economical recorder, the result being a shift in fine structure of the image which is barely noticeable.

The response to a square wave input signal has the characteristics diagrammatically indicated at 1702 in FIG. 4B under these circumstances.

[Column 23, lines 15–18] If desired, satisfactory compensation at these highest frequencies of the order of one megacycle per second and higher can be accomplished by additional circuits such as shown in incorporated FIG. 3 or FIG. 4.

[Column 23, line 10 et seq.] An overall response may be obtained in FIG. 2 generally as indicated in the sixteenth figure of said U.S. Pat. No. 3,531,600. In said U.S. Pat. No. 3,531,600 the response is shown as extending to 2.2 megacycles per second at the high from about 300 cycles at the low end. This may be termed the bandwidth of the amplifier 1534. However, the pedestal setting circuit effectively extends this to direct current. The normal recording level was approximately 35 to 40 decibels above the broad band noise level. These characteristics are considered satisfactory for a low-cost, non-professional recording unit. The frequency response indicated in the sixteenth figure of said U.S. Pat. No. 3,531,600 results in a playback picture image quality of acceptable level. It is found, however, that in the recording process a rising response or amplitude level of recording current as a function of frequency with constant input to the video amplifier stage in the region from 10,000 cycles per second to 100 kilocycles per second is beneficial, and this rising response characteristic for the recording circuit is indicated by the curve in the tenth figure of my U.S. Pat. No. 3,683,107.

[Column 23, line 73 et seq.] In the illustrated embodiment as in the embodiment of my U.S. Pat. No. 3,531,600 the recording level may be of the order of 8 to 10 decibels below tape saturation. The playback amplifier 1534 may utilize the playback circuit shown in the eighteenth figure of my U.S. Pat. No. 3,531,600.

[Column 24, line 11 et seq.] Referring to the ninth figure of my application Ser. 401,832, filed Oct. 6, 1964, now U.S. Pat. No. 3,495,046, the circuitry of incorporated FIG. 6A is designed to provide the phase correction in the curve designated (680) in the region designated by reference numeral (682). The phase shift as a function of frequency provided by amplifier 1534 compensates for the phase shift in head response in the region of resonance of the high impedance winding such as winding 1510.

[Column 24, line 26 et seq.] The maximum overall gain of the video amplifier circuit such as 1534 may vary between about 100 and 10,000 as a function of frequency. Actually the transistorized circuit as represented by component 1534 and as shown in the eighteenth figure of said U.S. Pat. No. 3,531,600 gives greater high frequency response and higher gain than the vacuum tube circuit shown in the seventeenth figure of said patent.

[Column 24, line 33 et seq.] The difference in circuit constants in the circuit of incorporated FIG. 6A and as represented by component 1534 and the corrresponding circuit of said U.S. Pat. No. 3,531,600 accounts for the deeper valley in response of the latter which crops to an amplification of only about 15 at 150 kc to match a different head characteristic.

[Column 24, line 38 et seq.] The high impedance winding such as 1510 is loaded by resistors such as 1512 but is not connected during recording and becomes effective during playback, in FIG. 2. The head winding 1510 is shunted by a resistor 1512 to flatten the resonance response characteristic of the high impedance winding at the resonance frequency of this winding with respect to the associated circuit capacitance. The low impedance winding such as 1511 (together with the associated high impedance winding 1510) is damped by the input resistance of the first transistor of amplifier 1534 which input resistance is comparable to the impedance of winding 1511 at medium and high frequencies within the range of the system.

[Column 25, line 34 et seq.] As previously described, when the windings such as 1510 and 1511 are connected in "bucking" relation with respect to low frequencies, the phase of the induced voltage in winding 1510 undergoes a reversal as a function of frequency as the frequency is increased through the resonance value for the winding 1510, so that the induced voltage in winding 1510 aids the induced voltage in winding 1511 at high frequencies between the resonance frequency of winding 1510 and resonance frequency of winding 1511. The amplifier frequency response and phase response is shaped to complement that of the head, giving smooth response, (as at 1701a, 1701c, FIG. 4A), uniform delay, (as at 1700a, 1700b, FIG. 4A) and good transient response (as in FIG. 4B) over the frequency spectrum of interest.

[Column 26, line 71 et seq.] The circuit values of a different successfully operated system in accordance with the present invention are given in a tabulation in my U.S. Pat. No. 3,683,107. As will be apparent to those skilled in the art the capacitor (C29) in the tabulation at column 20 of said patent should have a value of 0.25 microfarad in conformity with the value of capacitor 6-C29 given in my U.S. Pat. No. 3,596,008.

DISCUSSION OF FIGS. 3 and 4

Video magnetic record-play systems using longitudinal scanning (with stationary heads) and direct recording (withoug carrier) have attenuation at each end of the frequency spectrum as indicated at 1601 and 1602 in FIG. 3B. Such attenuation is not accompanied by the phase shift that is common in ordinary R-L-C equalizers; hence, if R-L-C equalizers are devised for correcting the system to give a flat frequency response at regions such as indicated at 1603 and 1604, in FIG. 3B, then phase errors will occur as indicated at 1605 and 1606 in FIG. 3B. In audio recording, where tape recorders first became established, such phase errors were considered unimportant and were neglected. In video recording these phase errors can give intolerable distortion of the picture and must be considered.

At lowest frequencies the wavelengths of direct video recordings are exceptionally long because the tape speed is high. For example at 30 cycles per second and a tape speed of 120 inches per second, the recorded wavelength is four inches long. This wavelength is so large compared to the head core size (which may have a dimension in the direction of tape movement thereacross of, for example, about 0.1 inch) that only a small fraction of the external tape flux is intercepted by the head, and the playback output voltage is correspondingly reduced. Yet the phase of the playback voltage is the same as if all of the flux were picked up, the voltage being a maximum during zero crossings of a sine wave recording (where the rate-of-change is maximum). When correction is applied using ordinary R-L-C equalizers for flattening the frequency response, as at region 1603 in FIG. 3, these equalizers advance the phase as indicated at 1605 as frequency is reduced, giving severe distortion of the picture.

At very high frequencies where the recorded wavelengths become smaller than the thickness of the magnetic tape layer, the recording efficiency falls off at a faster than normal rate because only a fraction of the magnetic layer thickness is effective. Again the phase is not shifted in proportion to the attenuation, so that correction of amplitude by R-L-C equalizers, for example as at region 1604, FIG. 3B, gives serious phase error in the form of a phase advance as frequency is increased as indicated at 1606 in FIG. 3B.

At extremely high frequencies there is additional attenuation of output due to the recorded wavelength becoming smaller than the head gap dimension so that the full magnetization cannot be picked up from the tape. Correction for such attenuation also produces phase errors.

The above characteristics are in addition to the more usual response characteristics due to rate-of-change of flux, to resonances, to dissipative losses, etc. which are correctable by R-L-C equalizers without producing phase shift problems.

It has been found, surprisingly, that the observed picture can be quite satisfactory and pleasing even with deficiencies in the frequency response amounting to 10 or 20 decibels in some cases provided that the phase conditions are nearly correct. Such deficiencies are indicated for example in FIG. 3B at 1601 and at 1602, and at 1701a and 1705 in FIG. 4A. On the other hand when the same video signal has its response deficiencies flattened by ordinary R-L-C networks as is represented at 1603 and 1604 in FIG. 3B, and at 1706, in FIG. 4A, the result becomes unsatisfactory or unusable. Thus is just the opposite of what occurs when a sound recording is treated in the same fashion.

In one approach using these findings, we incorporate a degree of correction that corrects for the usual response characteristics (rate of change, resonance, etc. noted above) but only partial correction or no correction for the abnormal ones due to long wavelengths, tape thickness or gap size. This approach is represented diagrammatically by the amplitude characteristic 1601, 1607, 1602 and by the corresponding phase characteristic 1608a, 1608b, 1608c in FIG. 3B; and by amplitude characteristic 1701a, 1709, 1705 and the corresponding phase characteristic 1700a, 1710, 1711 in FIG. 4A. We have found it advantageous however to add partial amplitude correction for abnormal losses as indicated at 1701c at the expense of slight phase shift as indicated at 1700b. In this respect we have found that more overcorrection is tolerable at high frequencies than at low. Usually no attempt is made to overcorrect the lowest frequencies. Because of its simplicity this first approach is advantageous in low cost recorders.

The first approach but with partial amplitude correction is represented in FIG. 4A by a corrected amplitude response at high frequencies (such as curve 1701c) lying in the region between the natural fall off curve 1705 and the curve 1706 where amplitude response is corrected for recorded wavelengths in the region between $\lambda=\lambda_t$ and $\lambda=0.2\lambda_t$. For the case of a tape thickness of 0.2 mil and a tape velocity of 120 inches per second, curve 1706 illustrates amplitude correction in the frequency range between 300 kilocycles per second and about 1.5 megacycles per second, while allowing the amplitude response to fall off at the normal rate in the region corresponding to recorded wavelengths between $\lambda=0.2\lambda_t$ and the upper useful response limit of the system (for example at 2.2 megacycles per second).

A second approach for more exacting results is to correct fully for a flat or nearly flat frequency response as represented at 1604 in FIG. 3B and to compensate for the induced phase error at 1606 by a special network as for example the one shown in incorporated FIG. 12. This network has the advantage that one terminal of its input and output can be grounded, so that it can be used readily in ordinary circuits without isolation transformers etc. which are very difficult or impossible to design over the necessary wide frequency band. The resistor (1222) of the phase correction network of incorporated FIG. 12 can be variable (see column 19 of U.S. Pat. No. 3,596,008, lines 45–47) and adjusted for optimum phase response, or alternatively the capacitor 1221 can be adjustable. Since the head windings of head 1400 of FIG. 1 are insulated from ground, the much more general lattice network 1425 of FIG. 1 can be used for phase correction, allowing frequency versus phase correction which cannot be obtained with simpler circuits. By using this network in the head circuit a transformer is not required. A single head winding can be used (U.S. Pat. No. 3,596,008, column 19, lines 16–30), whereas the network of incorporated FIG. 12 requires a tapped winding (or the equivalent).

It has been found that an overshoot occurs on the leading edge of a step function when played back from a tape recorder that has phase shift, even where the high frequency response is deficient. Experiments indicate that a certain amount of overshoot as indicated at 1707 in FIG. 4B has a beneficial effect on subjective picture quality where the overshoot has an amplitude as indicated above level 1712 in terms of voltage of approximately one to six decibels as indicated in FIG. 4B. Such a degree of overshoot is obtained with compensated amplitude response characteristics lying in the range between curve 1705 and curve 1706 in FIG. 4A. Curve portion 1713 indicates the phase error which occurs with compensated amplitude response as represented by curve 1706, while curve 1700b illustrates the reduced phase advance obtained with the circuit of FIG. 2 and an amplitude response as indicated at 1701c. We thus have the unexpected result that the best picture quality is obtained by purposely not correcting fully for a falling frequency response at the high limits of the spectrum, and not fully correcting the phase shift that normally occurs at the high frequency end in tape recorders in which this spectrum of the picture signal is recorded and played back directly.

By refraining from full R-L-C amplitude compensation at the high frequency spectrum, the degree of phase error is minimized while avoiding the need for special phase correction circuitry such as described in connection with FIG. 1. That degree of high frequency amplitude compensation which leads to an overshoot at 1707 at the leading edge of a reproduced step function of approximately one to six decibels can be considered advantageous, both in comparison to the non-compensated fall off as represented by curve 1705, and in comparison to a relatively fully conpensated amplitude response (exceeding that represented at 1706) where the resulting phase advance (exceeding that as shown at 1713) would produce an excessive overshoot at region 1707 in FIG. 4B. Thus a response with partial amplitude compensation, that is in the region above curve 1705 and up to curve 1706 in FIG. 4A, and corresponding to a step function response as represented in FIG. 4B with an overshoot amplitude 1707 of one to six decibels can be considered optimum for an extremely simple low cost home video transducer system.

At the low frequency end of the useful video spectrum, as represented in FIG. 4B, phase shift is generally detrimental. It is beneficial to correct the lowest useful frequencies of direct recording, by increasing the frequency response above the level of a strictly flat response as represented at 1714. This may be done in a smooth manner for an octave or two just above the low frequency cutoff of the system such as represented by curve 1701b. Thus an optimum minimum cost system as disclosed herein would have an amplitude response characteristic at high frequencies as represented at 1715, 1701b, 1709 and 1701c, with the curve 1701c considered as lying substantially above the curve 1705, but not lying substantially above the amplitude compensation curve 1706, the curve 1701c corresponding to a phase advance as function of frequency as generally indicated at 1700b which is sufficiently moderate to correspond to a step function response with an overshoot of approximately one to six decibels as indicated at 1707 in FIG. 4B.

For more precise correction, more elaborate networks as for example the lattice type of FIG. 1 can be used. It will generally be necessary to use high frequency and low frequency correction networks in tandem, providing phase compensation as indicated at 1610 and 1611 in FIG. 3B, so as to provide a resultant overall flat phase response as indicated at 1608a, 1608b, 1608c. Placing the phase correction networks in the head winding circuit as indicated in FIG. 1 is advantageous because the most general circuits can be used, unlimited by grounding considerations. As a substitute for lumped constant phase correction networks, transmission lines can be used, particularly for the high frequency region of the response range. FIG. 3A shows at 1612 the overshoot response for a system having a flattened frequency response as indicated at 1604 in FIG. 3B, in the absence of compensation for high frequency phase advance such as indicated at 1606. FIG. 3C shows the step response waveform for the system of FIG. 3B where the phase is corrected to give a resultant phase characteristic as indicated at 1608c in FIG. 3B.

For a lattice-type network such as 1425, FIG. 1, the center tap between windings 1410 and 1411 is not grounded if terminal 4 is grounded.

In FIG. 4A, curve portion 1714 illustrates the effect on phase of the boost in amplitude response at 1701b, curve 1715 showing the result phase characteristic at low frequencies corresponding to response as at 1715, 1701b.

In FIG. 4B, the overshoot in decibels is obtained from the ratio of overshoot amplitude $a$ to the average amplitude $b$ indicated in this figure.

I claim as my invention:

1. A video magnetic transducing system having a wideband video playback channel including a grounded input video amplifier, said playback channel further comprising:

a. a video magnetic transducer head having a magnetic core with a gap for coupling of the magnetic core with a magnetic record medium and having electric winding means on the magnetic core for supplying a video playback signal having a time sequence and a frequency spectrum in accordance with a television signal, said electric winding means having winding output terminals floating relative to ground potential, b. a passive four terminal network having first and second input terminals, and having first and second output terminals one of which is at ground potential, said passive four terminal network comprising first impedances connected respectively directly between said first input terminal and said first output terminal, and directly between said second input terminal and said second output terminal, and comprising second impedances connected respectively directly between said first input terminal and said second output terminal, and directly between said second input terminal and said first output terminal, and c. completely passive conductor means floating relative to ground potential and providing direct conductive connections between the winding output terminals and the first and second input terminals of said four terminal network, without the interposition of any transformer between the electric winding means on the magnetic core of the transducer head and the output terminals of said four terminal network, whereby the first and second impedances of said passive four terminal network are all effective for correcting the video playback signal as supplied from the head.

2. A video magnetic transducing system having a video playback channel for transmitting video signals, and including a grounded input video amplifier, said playback channel further comprising:

a. a video magnetic transducer head having a magnetic core with a signal flux path therein for coupling with a magnetic record medium and having magnetic flux sensing means in direct coupling relation with the signal flux path of the magnetic core for supplying a video playback signal having a time sequence in accordance with a video signal representing a moving scene of forward time sequence, said magnetic flux sensing means having electric output terminals floating relative to ground potential, b. a passive four terminal phase correcting network having first and second input terminals, and having first and second output terminals one of which is at ground potential, said passive four terminal phase correcting network comprising respective first impedances connected directly between said first input terminal and said first output terminal, and directly between said second input terminal and said second output terminal, and comprising respective second impedances connected directly between said first input terminal and said second output terminal, and directly between said second input terminal and said first output terminal, and c. completely passive conductor means floating relative to ground potential and providing direct conductive connections between the electric output terminals and the first and second input terminals of said four terminal phase correcting network, without the interposition of any transformer between the magnetic flux sensing means of the transducer head and the grounded input of said video amplifier, the respective first impedances and the respective second impedances of said passive four terminal network each having at least one ungrounded terminal, and said impedances together defining a phase correcting lattice network.

\* \* \* \* \*